(12) United States Patent
Ito et al.

(10) Patent No.: US 6,465,988 B2
(45) Date of Patent: Oct. 15, 2002

(54) CHARGING/DISCHARGING CONTROL DEVICE AND METHOD FOR CANCELING MEMORY EFFECT IN SECONDARY BATTERY

(75) Inventors: Shinichiro Ito, Shizuoka (JP); Yusai Murakami, Shizuoka (JP); Seiji Bito, Shizuoka (JP); Tadao Kimura, Hyogo (JP)

(73) Assignees: Matsushita Electric Industrial Co., Ltd., Kadoma (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/839,878

(22) Filed: Apr. 20, 2001

(65) Prior Publication Data

US 2001/0035742 A1 Nov. 1, 2001

(30) Foreign Application Priority Data

Apr. 28, 2000 (JP) ........................................ 2000-131756

(51) Int. Cl.⁷ ........................ H01M 10/44; H01M 10/46
(52) U.S. Cl. ..................................................... 320/131
(58) Field of Search ................................. 320/131, 134, 320/136, 152, 157, 158, 162, 163

(56) References Cited

U.S. PATENT DOCUMENTS 6,252,374 B1 * 6/2001 Morrison et al. ........... 320/113
6,265,877 B1 * 7/2001 Kimura et al. .......... 320/136 X

FOREIGN PATENT DOCUMENTS

JP            7-122304           5/1995

* cited by examiner

*Primary Examiner*—Edward H. Tso
(74) *Attorney, Agent, or Firm*—Merchant & Gould P.C.

(57) ABSTRACT

A device and a method are provided in which memory effects can be cancelled by controlling charging and discharging of a secondary battery during driving of a vehicle. When a memory effect determinator determines that the discharging memory effect has occurred, based on at least one of the following determinations: whether a time of charging/discharging of a secondary battery has reached a predetermined time; whether a charging/discharging amount in the secondary battery has reached a predetermined amount; and whether a voltage per cell has reached a voltage V1 at a lower-limit state of charge in a range of capacity actually used, a discharging controller discharges the secondary battery until the voltage per cell reaches a voltage V3 that is higher than 1.0 V and is lower than the voltage V1 at the lower-limit state of charge.

28 Claims, 12 Drawing Sheets

CHARGING/DISCHARGING CONTROL DEVICE AND METHOD FOR CANCELING MEMORY EFFECT IN SECONDARY BATTERY

BACKGROUND OF THE INVENTION

1. Field of the Invention

The present invention relates generally to a technique of canceling memory effects in secondary batteries, particularly to a technique of canceling memory effects in secondary batteries used for applications in which the secondary batteries are charged and discharged repeatedly in a charged but not fully charged state and it is difficult to discharge the secondary batteries completely.

2. Related Background Art

Examples of the secondary battery include lead batteries, nickel-cadmium (Ni-Cd) batteries, nickel metal-hydride (Ni-MH) batteries, and lithium ion batteries. Such batteries have a characteristic allowing them to be connected to an external power source to be charged with a predetermined current supplied from the power source after consumption of their electric power. These batteries have been used for various equipment, making good use of such a characteristic. For instance, such a battery may be mounted on a vehicle to supply electric power to an ignition plug of its engine. Recently, such a battery also is used as a main power source for driving an electric motor in a pure electric vehicle (PEV) or a so-called hybrid electric vehicle (HEV) provided with an engine and an electric motor.

For instance, in the case of a secondary battery mounted on a HEV, the secondary battery may be charged and discharged repeatedly while the HEV is driven. In the HEV, when the output of its engine is higher than the required power for driving, a generator is driven with the surplus power to charge the secondary battery. On the contrary, when the output of the engine is lower than the required power, an electric motor is driven with the electric power of the secondary battery to output power sufficient to cover the shortage of the required power. In this case, the secondary battery is discharged. Such repeated charge and discharge are carried out according to the driving state of the vehicle, the charged state of the battery, and an operation of a driver.

In this manner, when an incomplete charge and discharge of the secondary battery are repeated, the actually usable capacity is reduced accordingly and a so-called memory effect occurs. Usually, the secondary battery with its capacity reduced temporarily due to this memory effect can recover its actual capacity by being discharged completely.

For instance, in the case of the Ni-MH battery, the memory effect can be cancelled when the battery is forced to be discharged until the voltage per cell drops to 1V.

In the secondary battery system to be loaded on a HEV, however, a number of cells are connected in series to form a battery assembly in order to obtain the required output for driving an electric motor, and a battery voltage, current, and temperature are monitored so that the charge and discharge are repeated with the state of charge (SOC) of the secondary battery being in a range of 30% to 75% of a fully charged state. In such a system, when there is complete discharge for the cancellation of the memory effect during driving of the vehicle, there is a possibility that a severe trouble such as stoppage of the vehicle on the road may be caused.

Hence, it has been necessary to stop the vehicle at a charging site or the like, to discharge the secondary battery completely, and then to charge the secondary battery for a predetermined time until the secondary battery is fully charged.

SUMMARY OF THE INVENTION

With the foregoing in mind, it is an object of the present invention to provide a charging/discharging control device and method in which the memory effect can be cancelled during driving of the vehicle.

In order to achieve the above-mentioned object, a first charging/discharging control device according to the present invention includes a secondary battery, a memory effect determinator, and a discharging controller. The secondary battery is formed of a battery assembly with a plurality of cells combined with one another. The memory effect determinator determines whether a discharging memory effect has occurred, based on at least one of the following determinations: whether a time of charging/discharging of the secondary battery has reached a predetermined time; whether a charging/discharging amount in the secondary battery has reached a predetermined amount; and whether a voltage per cell has reached a voltage V1 at a lower-limit state of charge in a range of capacity actually used. The discharging controller discharges the secondary battery until the voltage per cell reaches a voltage V3 that is higher than 1.0 V and is lower than the voltage V1 at the lower-limit state of charge when the memory effect determinator determines that the discharging memory effect has occurred.

In order to achieve the above-mentioned object, a second charging/discharging control device according to the present invention includes a secondary battery, a memory effect determinator, and a discharging controller. The secondary battery is formed of a battery assembly with a plurality of cells combined with one another. The memory effect determinator determines whether a discharging memory effect has occurred, based on at least one of the following determinations: whether a time of charging/discharging of the secondary battery has reached a predetermined time; whether a charging/discharging amount in the secondary battery has reached a predetermined amount; and whether a voltage per cell has reached a voltage V1 at a lower-limit state of charge in a range of capacity actually used. The discharging controller discharges the secondary battery for a predetermined amount from the lower-limit state of charge when the memory effect determinator determines that the discharging memory effect has occurred.

Preferably, the first and second charging/discharging control devices further include a charging controller for charging the secondary battery until the voltage per cell reaches a voltage V4 that is higher than a voltage V2 at an upper-limit state of charge in the range of capacity actually used after completion of the discharging of the secondary battery by the discharging controller based on the determination by the memory effect determinator that the discharging memory effect has occurred.

It is preferable that discharging and charging of the secondary battery are repeated in this order at least once, wherein the discharging is carried out by the discharging controller until the voltage per cell reaches the voltage V3, which is lower than the voltage V1 at the lower-limit state of charge, from the voltage V4, which is higher than the voltage V2 at the upper-limit state of charge, and the charging is carried out by the charging controller until the voltage per cell reaches the voltage V4, which is higher than the voltage V2 at the upper-limit state of charge, from the voltage V3, which is lower than the voltage V1 at the lower-limit state of charge.

Preferably, the first charging/discharging control device further includes a charging level corrector for correcting a charging level at the lower-limit state of charge based on a discharging amount when discharging is carried out until the voltage per cell reaches the voltage V3, which is lower than the voltage V1 at the lower-limit state of charge, from the voltage V1 by the discharging controller.

Preferably, the second charging/discharging control device further includes a charging level corrector for correcting a charging level at the lower-limit state of charge based on the voltage per cell after the secondary battery is discharged for the predetermined amount from the lower-limit state of charge by the discharging controller.

In order to achieve the above-mentioned object, a third charging/discharging control device according to the present invention includes a secondary battery, a memory effect determinator, and a charging controller. The secondary battery is formed of a battery assembly with a plurality of cells combined with one another. The memory effect determinator determines whether a charging memory effect has occurred, based on at least one of the following determinations: whether a time of charging/discharging of the secondary battery has reached a predetermined time; whether a charging/discharging amount in the secondary battery has reached a predetermined amount; and whether a voltage per cell has reached a voltage V2 at an upper-limit state of charge in a range of capacity actually used. The charging controller charges the secondary battery until the voltage per cell reaches a voltage V4 that is higher than the voltage V2 at the upper-limit state of charge when the memory effect determinator determines that the charging memory effect has occurred.

In order to achieve the above-mentioned object, a fourth charging/discharging control device according to the present invention includes a secondary battery, a memory effect determinator, and a charging controller. The secondary battery is formed of a battery assembly with a plurality of cells combined with one another. The memory effect determinator determines whether a charging memory effect has occurred, based on at least one of the following determinations: whether a time of charging/discharging of the secondary battery has reached a predetermined time; whether a charging/discharging amount in the secondary battery has reached a predetermined amount; and whether a voltage per cell has reached a voltage V2 at an upper-limit state of charge in a range of capacity actually used. The charging controller charges the secondary battery for a predetermined amount from the upper-limit state of charge when the memory effect determinator determines that the charging memory effect has occurred.

Preferably, the third and fourth charging/discharging control devices further include a discharging controller for discharging the secondary battery until the voltage per cell reaches a voltage V3 that is lower than a voltage V1 at a lower-limit state of charge in the range of capacity actually used after completion of the charging of the secondary battery by the charging controller based on the determination by the memory effect determinator that the charging memory effect has occurred.

It is preferable that charging and discharging of the secondary battery are repeated in this order at least once, wherein the charging is carried out by the charging controller until the voltage per cell reaches the voltage V4, which is higher than the voltage V2 at the upper-limit state of charge, from the voltage V3, which is lower than the voltage V1 at the lower-limit state of charge, and the discharging is carried out by the discharging controller until the voltage per cell reaches the voltage V3, which is lower than the voltage V1 at the lower-limit state of charge, from the voltage V4, which is higher than the voltage V2 at the upper-limit state of charge.

In order to achieve the above-mentioned object, a first charging/discharging control method according to the present invention includes: determining whether a discharging memory effect has occurred, based on at least one of the following determinations: whether a time of charging/discharging of a secondary battery formed of a battery assembly with a plurality of cells combined with one another has reached a predetermined time; whether a charging/discharging amount in the secondary battery has reached a predetermined amount; and whether a voltage per cell has reached a voltage V1 at a lower-limit state of charge in a range of capacity actually used; and discharging the secondary battery until the voltage per cell reaches a voltage V3 that is higher than 1.0 V and is lower than the voltage V1 at the lower-limit state of charge when it is determined that the discharging memory effect has occurred.

In order to achieve the above-mentioned object, a second charging/discharging control method according to the present invention includes determining whether a discharging memory effect has occurred, based on at least one of the following determinations: whether a time of charging/discharging of a secondary battery formed of a battery assembly with a plurality of cells combined with one another has reached a predetermined time; whether a charging/discharging amount in the secondary battery has reached a predetermined amount; and whether a voltage per cell has reached a voltage V1 at a lower-limit state of charge in a range of capacity actually used; and discharging the secondary battery for a predetermined amount from the lower-limit state of charge when it is determined that the discharging memory effect has occurred.

Preferably, the first and second charging/discharging control methods further include charging the secondary battery until the voltage per cell reaches a voltage V4 that is higher than a voltage V2 at an upper-limit state of charge in the range of capacity actually used after completion of the discharging of the secondary battery based on the determination that the discharging memory effect has occurred.

It also is preferable that discharging and charging of the secondary battery are repeated in this order at least once, wherein the discharging is carried out until the voltage per cell reaches the voltage V3, which is lower than the voltage V1 at the lower-limit state of charge, from the voltage V4, which is higher than the voltage V2 at the upper-limit state of charge, and the charging is carried out until the voltage per cell reaches the voltage V4, which is higher than the voltage V2 at the upper-limit state of charge, from the voltage V3, which is lower than the voltage V1 at the lower-limit state of charge.

Preferably, the first charging/discharging control method further includes correcting a charging level at the lower-limit state of charge based on a discharging amount when the discharging is carried out until the voltage per cell reaches the voltage V3, which is lower than the voltage V1 at the lower-limit state of charge, from the voltage V1.

Preferably, the second charging/discharging control method further includes correcting a charging level at the lower-limit state of charge based on the voltage per cell after the secondary battery is discharged for the predetermined amount from the lower-limit state of charge.

In order to achieve the above-mentioned object, a third charging/discharging control method according to the present invention includes determining whether a charging memory effect has occurred, based on at least one of the following determinations: whether a time of charging/discharging of a secondary battery formed of a battery assembly with a plurality of cells combined with one another has reached a predetermined time; whether a charging/discharging amount in the second battery has reached a predetermined amount; and whether a voltage per cell has reached a voltage V2 at an upper-limit state of charge in a range of capacity actually used; and charging the secondary battery until the voltage per cell reaches a voltage V4 that is higher than the voltage V2 at the upper-limit state of charge when it is determined that the charging memory effect has occurred.

In order to achieve the above-mentioned object, a fourth charging/discharging control method according to the present invention includes: determining whether a charging memory effect has occurred, based on at least one of the following determinations: whether a time of charging/discharging of a secondary battery formed of a battery assembly with a plurality of cells combined with one another has reached a predetermined time; whether a charging/discharging amount in the secondary battery has reached a predetermined amount; and whether a voltage per cell has reached a voltage V2 at an upper-limit state of charge in a range of capacity actually used; and charging the secondary battery for a predetermined amount from the upper-limit state of charge when it is determined that the charging memory effect has occurred.

Preferably, the third and fourth charging/discharging control methods further include discharging the secondary battery until the voltage per cell reaches a voltage V3 that is lower than a voltage V1 at a lower-limit state of charge in the range of capacity actually used after completion of the charging of the secondary battery based on the determination that the charging memory effect has occurred.

It also is preferable that charging and discharging of the secondary battery are repeated in this order at least once, wherein the charging is carried out until the voltage per cell reaches the voltage V4, which is higher than the voltage V2 at the upper-limit state of charge, from the voltage V3, which is lower than the voltage V1 at the lower-limit state of charge, and the discharging is carried out until the voltage per cell reaches the voltage V3, which is lower than the voltage V1 at the lower-limit state of charge, from the voltage V4, which is higher than the voltage V2 at the upper-limit state of charge.

According to the configurations and methods described above, the memory effect caused during discharging is detected based on the charging/discharging time, charging/discharging amount, and voltage drop to the voltage corresponding to the lower-limit state of charge of the secondary battery during driving of the vehicle. Then, the battery is discharged to reach a lower state of charge than a lower-limit state of charge in the range of capacity actually used and thus the discharging memory effect in the range of capacity actually used is cancelled. In addition, the charging level at the lower-limit state of charge is corrected, so that the state of charge is controlled accurately. Afterward, the secondary battery is charged to reach a higher state of charge than the upper-limit state of charge, so that the charging memory effect also can be cancelled.

During driving of the vehicle, the memory effect caused during charging is detected based on the charging/discharging time, charging/discharging amount, and voltage rise to the voltage corresponding to the upper-limit state of charge in the range of capacity actually used of the secondary battery. The battery is charged to reach a higher state of charge than the upper-limit state of charge, so that the charging memory effect in the range of capacity actually used is cancelled. Afterward, the battery is discharged to reach a lower state of charge than the lower-limit state of charge, so that the discharging memory effect also can be cancelled.

DETAILED DESCRIPTION OF THE INVENTION

Suitable embodiments of the present invention are described with reference to the drawings as follows.

First Embodiment

Figure 1:
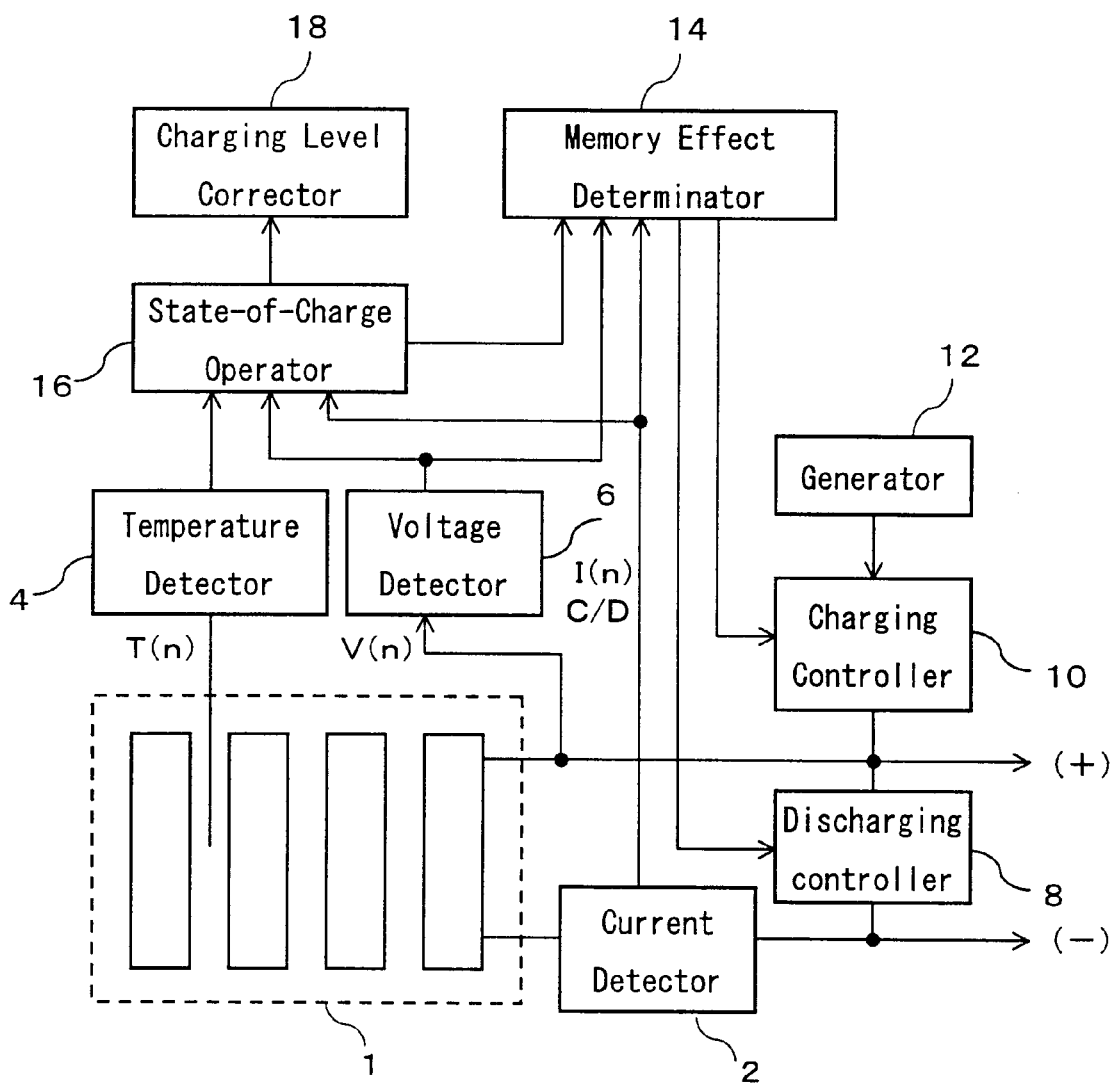
FIG. 1 is a block diagram showing a configuration of a charging/discharging control device according to a first embodiment of the present invention.

FIG. 1 is a block diagram showing a configuration of a charging/discharging control device according to a first embodiment of the present invention.

In FIG. 1, numeral 1 indicates a secondary battery formed of, for example, a nickel metal-hydride battery to be loaded on a hybrid electric vehicle or the like. Usually, this secondary battery 1 includes a battery pack formed of a battery assembly with a number of cells combined with one another to obtain a predetermined output power for an electric motor.

Numeral 2 is a current detector disposed between a minus output terminal of the secondary battery 1 and a minus input terminal (−) of the electric motor (not shown in the figure). The current detector samples a charging/discharge current of the secondary battery 1 output from a current sensor (not shown in the figure) per predetermined time to obtain a current sample I(n) and thus detects the magnitude of the current. In addition, the current detector also detects that the current is a charge or discharge (C/D) current based on the sign of the current sample I(n). In the present embodiment, the case where the sign of the current sample I(n) is positive is set to indicate discharge.

Numeral 4 indicates a temperature detector. The temperature detector 4 samples a battery temperature output from a temperature sensor (not shown in the figure) disposed in a predetermined position inside the secondary battery 1 per predetermined time to obtain a temperature sample T(n).

Numeral 6 is a voltage detector. The voltage detector 6 samples an output voltage from the secondary battery 1 per predetermined time to obtain a voltage sample V(n) at least per cell.

The current sample I(n) from the current detector 2, the temperature sample T(n) from the temperature detector 4, and the voltage sample V(n) from the voltage detector 6 are sent to a state-of-charge (SOC) operator 16. Thus, the state of charge of the secondary battery 1 is calculated and determined.

The current sample I(n) and charging or discharging direction obtained by the current detector 2, the charging/discharging amount and state of charge determined in the state-of-charge operator 16, and the voltage sample V(n) obtained by the voltage detector 6 are sent to a memory effect determinator 14. The memory effect determinator 14 determines whether a memory effect has occurred during discharging or charging, based on one or more of the following determinations: whether the charging/discharging time has reached a predetermined time; whether the charging/discharging amount has reached a predetermined amount according to driving of the vehicle; or whether the voltage per cell has reached a voltage V1 (for instance, about 1.2 V per cell) at a lower-limit state of charge SOCa1 (for example, 30% of the fully charged state) in a range of capacity actually used during the discharging; and whether the voltage per cell has reached a voltage V2 (for instance, about 1.4V per cell) at an upper-limit state of charge SOCb1 (for example, 75% of the fully charged state) in a range of capacity actually used during the charging.

Numeral 8 indicates a discharging controller. The discharging controller 8 cancels the memory effect caused during the discharging by further discharging the secondary battery 1 based on the discharging control signal from the memory effect determinator 14 when the memory effect determinator 14 determines that the memory effect has occurred during the discharging.

Numeral 10 indicates a charging controller. The charging controller 10 cancels the memory effect caused during the charging by further charging the secondary battery 1 with regenerative electric power from a generator 12 based on the charging control signal from the memory effect determinator 14 when the memory effect determinator 14 determines that the memory effect has occurred during the charging.

Numeral 18 indicates a charging level corrector. The charging level corrector 18 calculates a correction amount for correcting the charging level of the secondary battery 1 when the state of charge reaching the voltage V1 deviates from 30% as the lower-limit state of charge due to the distance driven by the vehicle or the like in canceling the memory effect caused during the discharging.

Next, a control process according to the first embodiment with the above-mentioned configuration is described with reference to FIGS. 2, 3, and 4.

Figure 2:
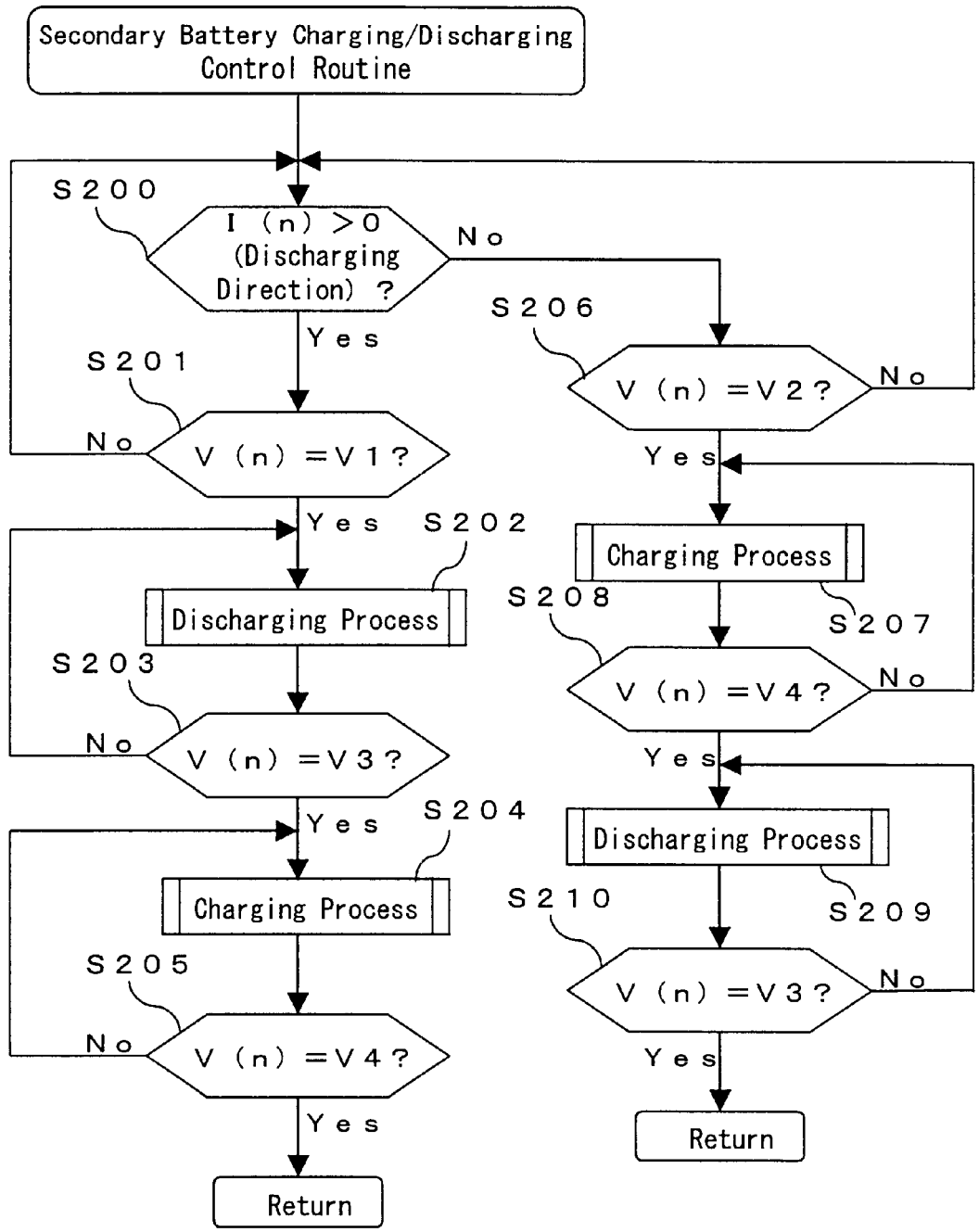
FIG. 2 is a flowchart showing a secondary-battery charging/discharging control routine according to the first embodiment of the present invention.

FIG. 2 is a flowchart showing a secondary battery charging/discharging control routine according to the first embodiment of the present invention.

Figure 3:
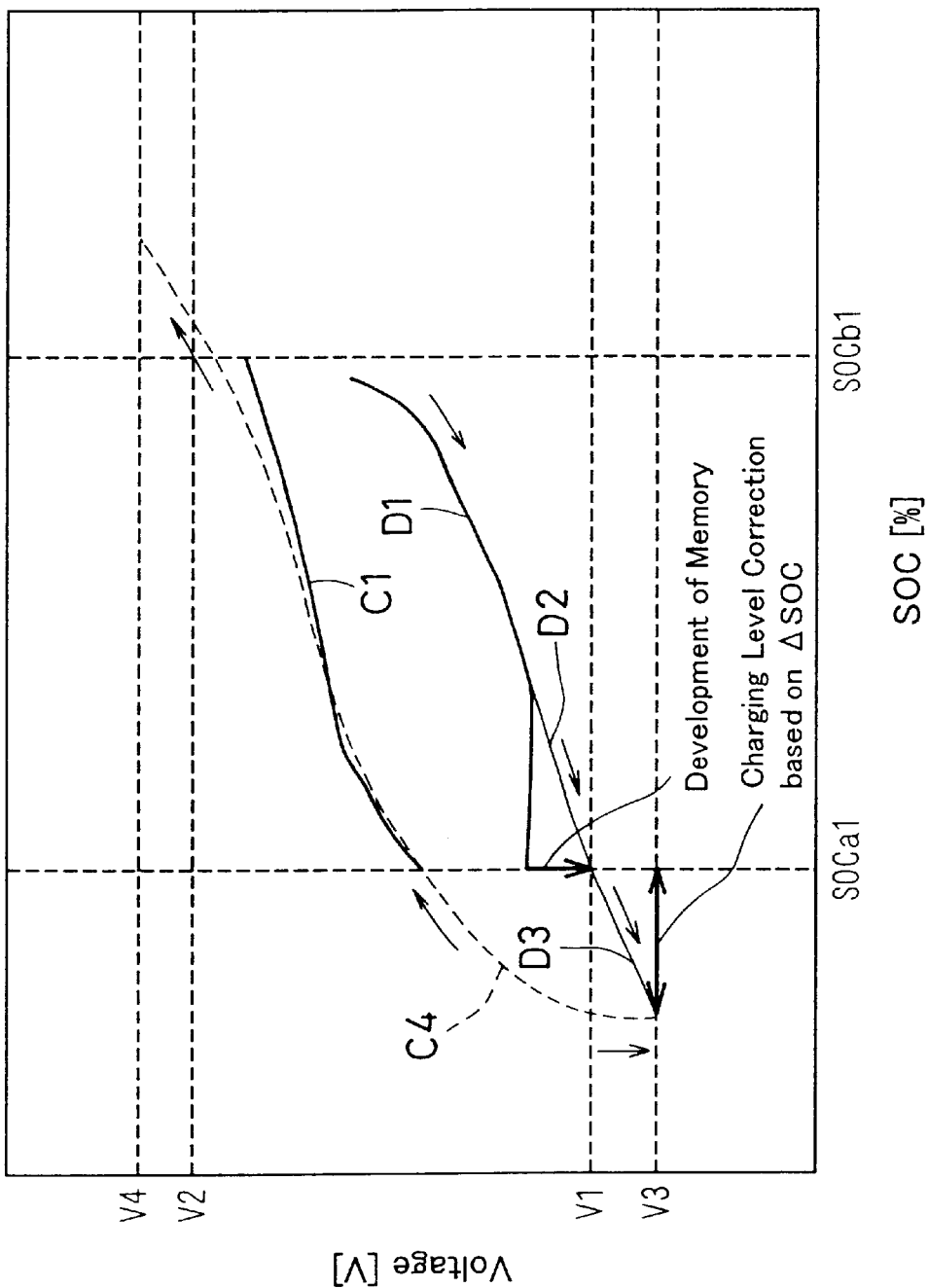
FIG. 3 is a graph showing a curve indicating a battery voltage with respect to a state of charge SOC, for explaining a method of canceling a memory effect caused during discharging according to the first embodiment.
Figure 4:
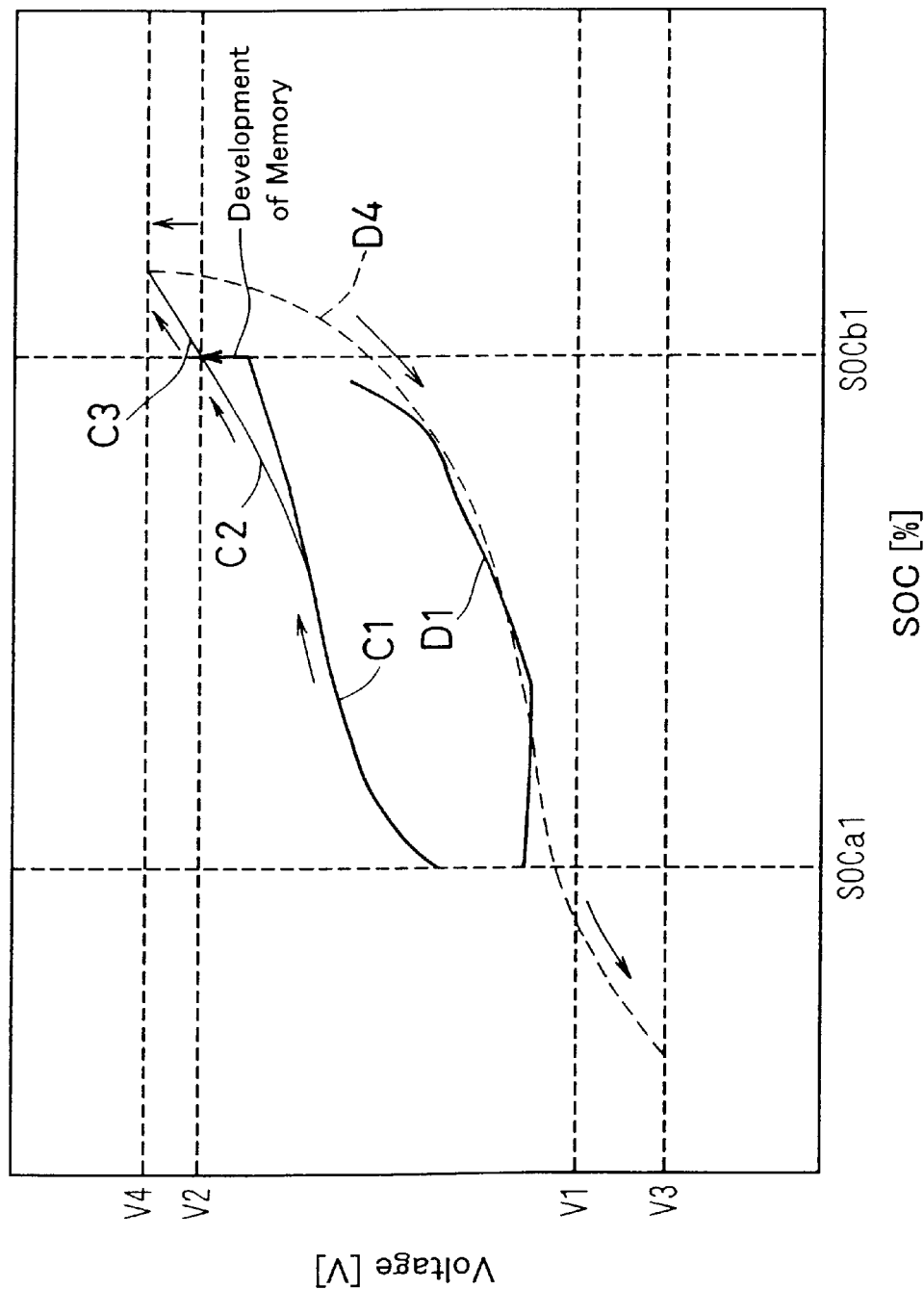
FIG. 4 is a graph showing a curve indicating a battery voltage with respect to a state of charge SOC, for explaining a method of canceling a memory effect caused during charging according to the first embodiment.

FIGS. 3 and 4 are graphs obtained by plotting battery voltages with respect to the state of charge, for explaining the methods of canceling the memory effects caused during discharging and charging according to the first embodiment, respectively.

In FIG. 2, initially, it is determined whether the sign of the current sample I(n) indicates the discharging direction (i.e. whether the sign is positive) (S200). When it is determined at step 200 that the discharging direction is indicated, the procedure is advanced to step 201. On the other hand, when it is determined at step 200 that the charging direction (negative) is indicated, the procedure is advanced to step 206.

When the determination that the sign of the current sample I(n) indicated the discharging direction was made at step 200, it is determined whether the voltage sample V(n) at least per cell of the secondary battery has dropped to the voltage V1 (about 1.2 V per cell) at the lower-limit state of charge SOCa1 (about 30% of the fully charged state) of the secondary battery used during driving of the vehicle (S201). When the determination that the voltage sample V(n) at least per cell had not dropped to the voltage V1 was made at step 201, it is determined that the memory effect has not occurred during discharging and thus the procedure is returned to step 200 (i.e. following a discharge curve D1 in the ordinary case shown in FIG. 3).

When the determination that the voltage sample V(n) at least per cell had reached the voltage V1 was made at step 201 (the curve D1 shifts to the curve D2 shown in FIG. 3), it is determined that the memory effect has occurred during the discharging and a discharging process is carried out further to discharge the secondary battery (S202). Next, it is determined whether the voltage sample V(n) at least per cell has dropped to the voltage V3 (about 1.1 V per cell) as the result of the discharging process at step 202 (S203). When it is determined at step 203 that the voltage sample V(n) has not dropped to the voltage V3, the discharging process at step 202 continues (i.e. following a discharge curve D3 shown in FIG. 3).

When it was determined at step 203 that the voltage sample V(n) at least per cell had dropped to the voltage V3, the procedure is advanced to step 204 and a charging process is carried out to prevent the occurrence of the memory effect during charging.

As a next step, it is determined whether the voltage sample V(n) at least per cell has risen to the voltage V4 (for instance, about 1.5 V per cell) exceeding the voltage V2 (about 1.4 V per cell) at the upper-limit state of charge used during driving of the vehicle by the charging process at step 204 (S205). When it is determined at step 205 that the voltage sample V(n) has not risen to the voltage V4, the charging process at step 204 continues (i.e. following the charging curve C4 shown in FIG. 3).

When it was determined at step 205 that the voltage sample V(n) had risen to the voltage V4, the secondary battery charging/discharging control routine in the discharging direction is ended.

Next, the following description is directed to the case of canceling the memory effect caused during charging.

When it is determined at step 200 described above that the sign of the current sample I(n) indicates the charging direction, the procedure is advanced to step 206 and it is determined whether the voltage sample V(n) at least per cell of the secondary battery has risen to the voltage V2 (about 1.4 V per cell) at the upper-limit state of charge SOCb1 (about 75% of the fully charged state) of the secondary battery used during driving of the vehicle. When the determination that the voltage sample V(n) at least per cell had not risen to the voltage V2 was made at step 206, it is determined that the memory effect has not occurred during the charging and the procedure is returned to step 200 (i.e. following the charging curve C1 in an ordinary case shown in FIG. 4).

When the determination that the voltage sample V(n) at least per cell had reached the voltage V2 was made at step 206 (the curve C1 shifts to the curve C2 shown in FIG. 4), it is determined that the memory effect has occurred during the charging and thus a charging process is carried out further to charge the secondary battery (S207). Next, it is determined whether the voltage sample V(n) at least per cell has risen to the voltage V4 (about 1.5 V per cell) as the result of the charging process at step 207 (S208). When it is determined at step 208 that the voltage sample V(n) has not risen to the voltage V4, the charging process at step 207 continues (i.e. following the charging curve C3 shown in FIG. 4).

When it was determined at step 208 that the voltage sample V(n) at least per cell had risen to the voltage V4, the procedure is advanced to step 209 and the discharging process is carried out to prevent the occurrence of the memory effect during discharging.

Next, it is determined whether the voltage sample V(n) at least per sample has dropped to the voltage V3 (about 1.1 V per cell) below the voltage V1 (about 1.2 V per cell) at the lower-limit state of charge by the discharging process at step 209 (S210). When it is determined at step 210 that the voltage sample V(n) has not dropped to the voltage V3, the discharging process at step 209 continues (i.e. following the discharging curve D4 shown in FIG. 4).

When it was determined at step 210 that the voltage sample V(n) had dropped to the voltage V3, the secondary battery charging/discharging control routine in the charging direction is ended.

Second Embodiment

A second embodiment of the present invention is described with reference to FIGS. 5, 6, and 7.

Figure 5:
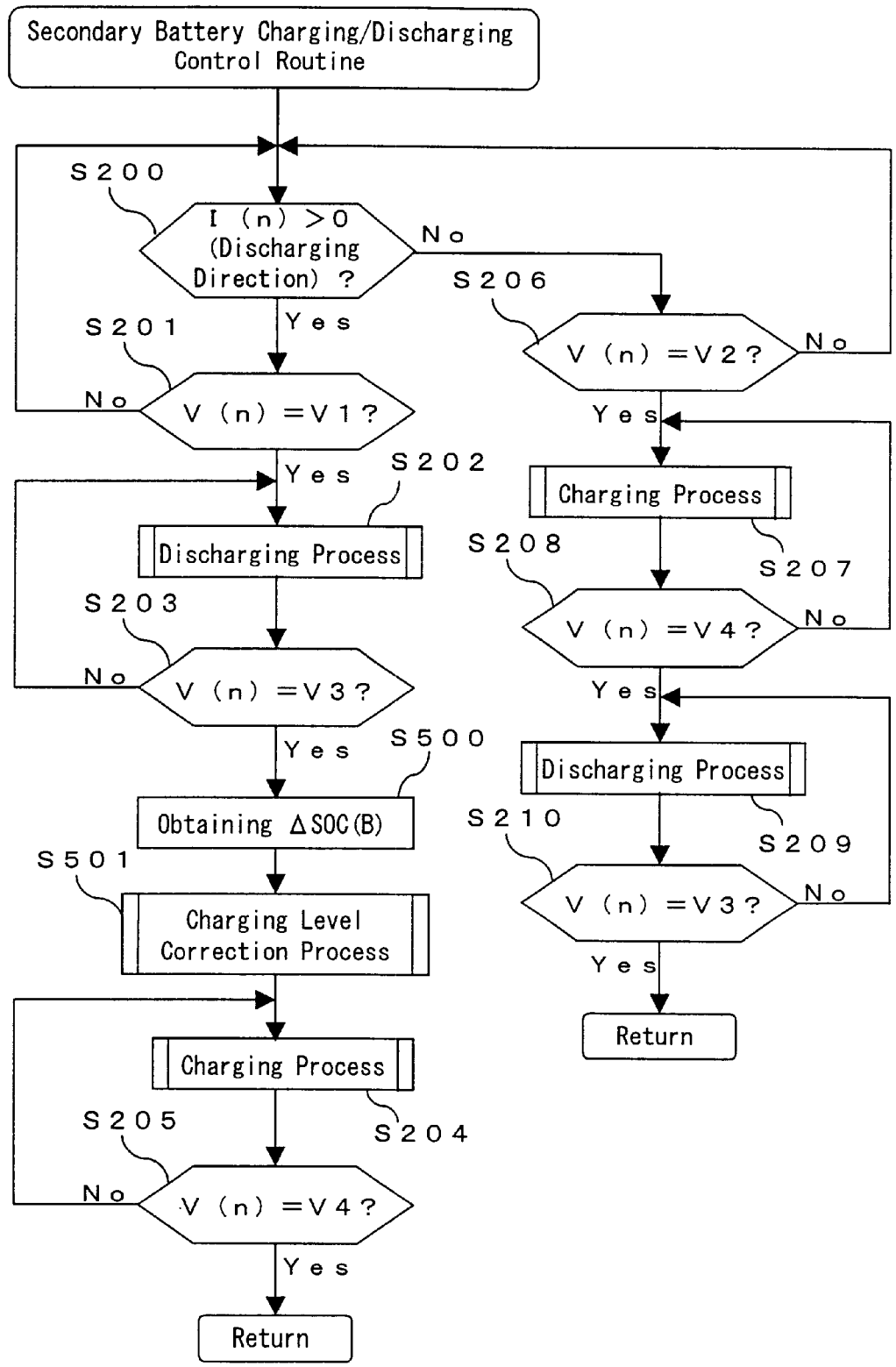
FIG. 5 is a flowchart showing a secondary-battery charging/discharging control routine according to a second embodiment of the present invention.

FIG. 5 is a flowchart showing a secondary battery charging/discharging control routine according to the second embodiment of the present invention. The present embodiment is different from the first embodiment in that in addition to the cancellation of the memory effects during discharging and charging, a charging level of the secondary battery is corrected and thus the range of capacity actually used is controlled accurately when the state of charge reaching the voltage V1 deviates from the lower-limit state of charge SOCa1 (about 30% of the fully charged state) due to the distance the vehicle was driven or the like. In the following, only the different steps from those in the first embodiment are described. The same steps as in the first embodiment are indicated with the same numerals or characters and their descriptions are not repeated.

Figure 6:
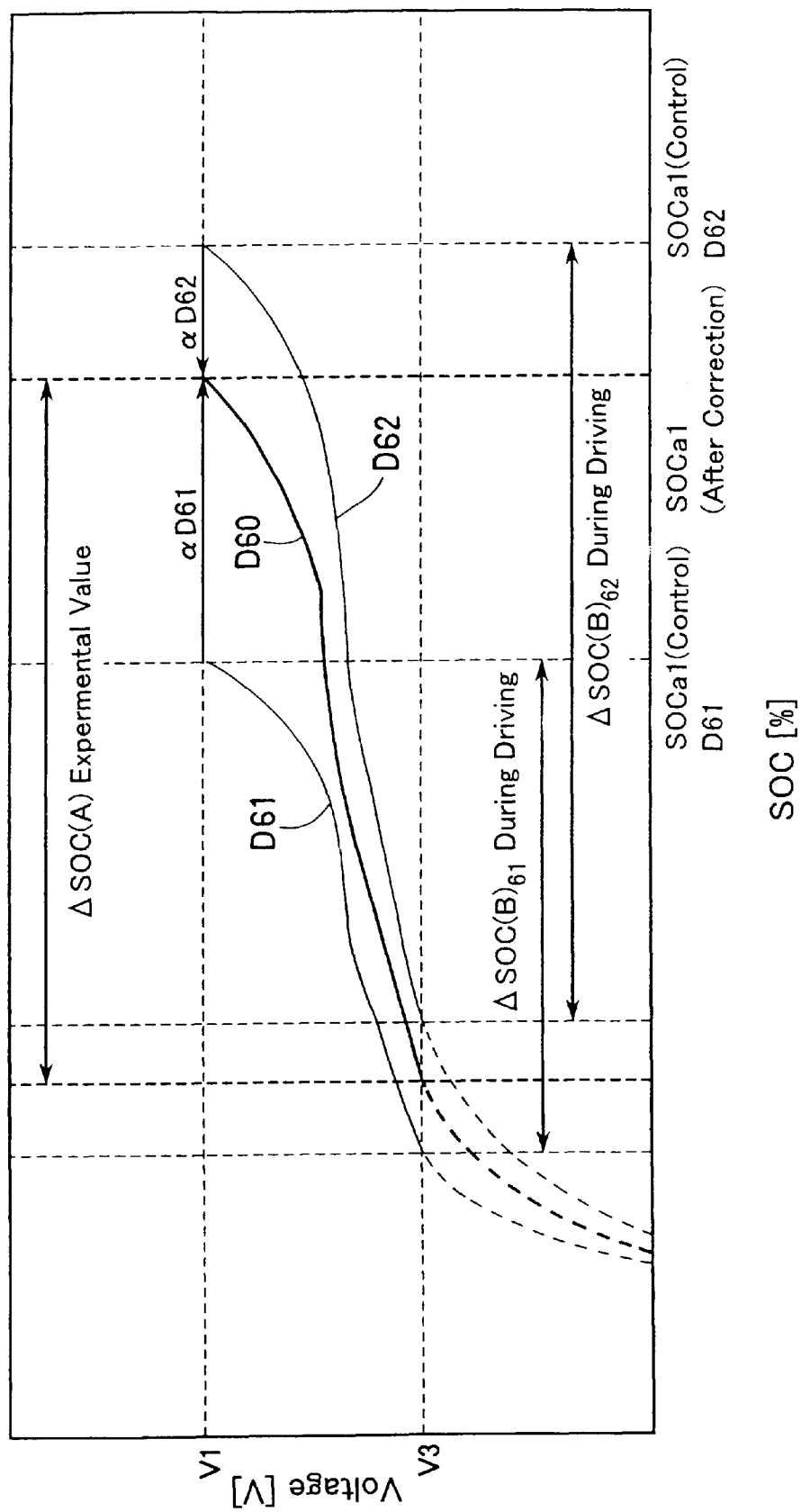
FIG. 6 is a graph showing a curve indicating a battery voltage with respect to a state of charge SOC, for explaining a charging level correction during discharging of a secondary battery according to the second embodiment.
Figure 7:
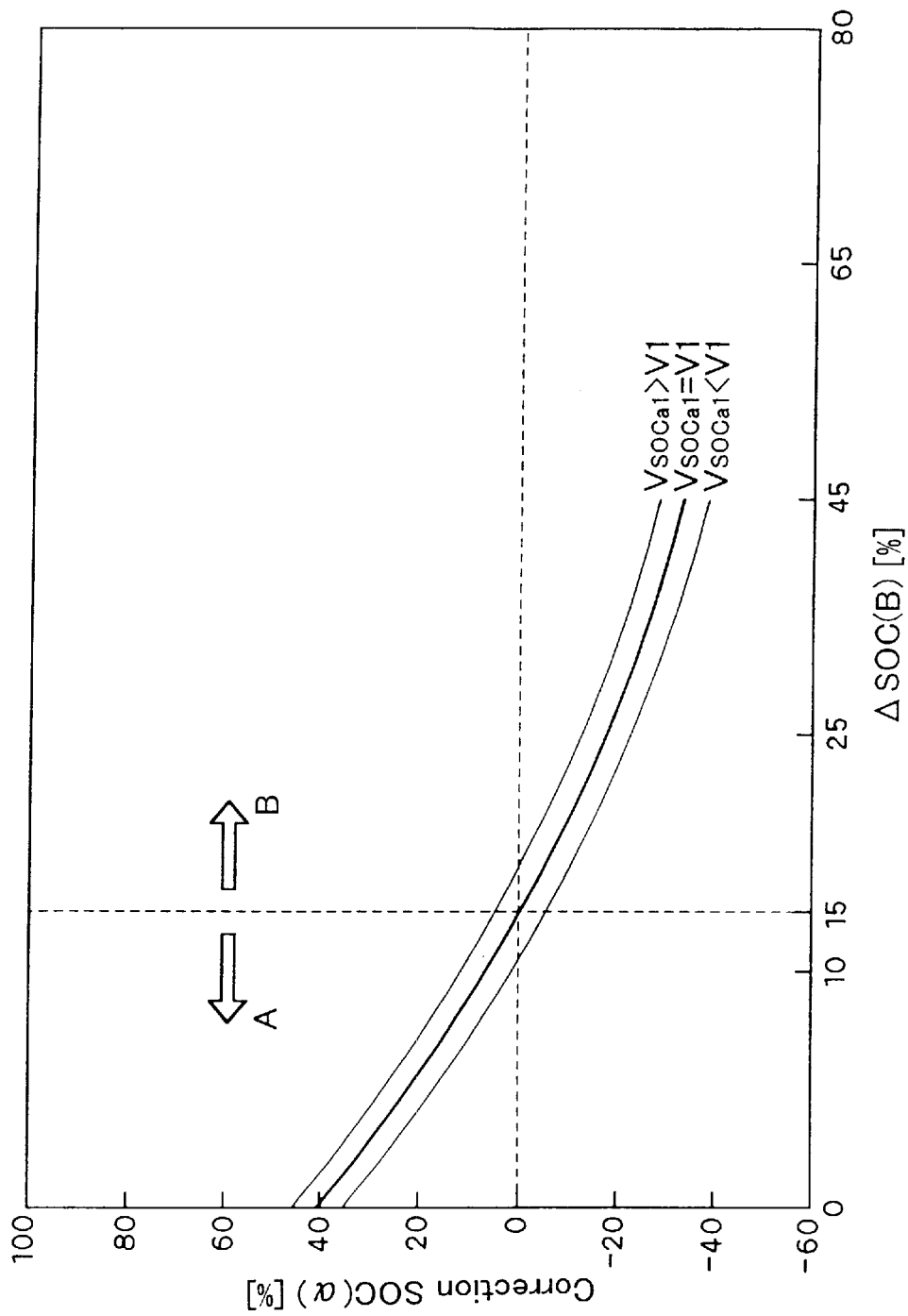
FIG. 7 is a graph showing a curve indicating a correction amount α with respect to a measured variation ΔSOC(B) from a lower-limit state of charge SOCa1, for explaining the charging level correction during discharging of a secondary battery according to the second embodiment.

FIGS. 6 and 7 are a graph showing a curve indicating a battery voltage with respect to the state of charge SOC and a graph showing a curve indicating a correction amount $\alpha$ with respect to the measured variation $\Delta SOC(B)$ from the lower-limit state of charge SOCa1, respectively, for explaining the charging level correction in discharging of the secondary battery according to the second embodiment.

In FIG. 5, when it was determined at step 203 that the voltage sample V(n) at least per cell had dropped to the voltage V3, the memory effect caused during discharging has been cancelled. Next, the procedure is advanced to step 500, and when the state of charge reaching the voltage V1 deviates from the lower-limit state of charge SOCa1 (about 30% of the fully charged state) during driving of the vehicle, the variation $\Delta SOC(B)$ is obtained.

FIG. 6 shows a curve D60 experimentally obtained and curves D61 and D62 in the cases of deviations to the lower and higher levels from the lower-limit state of charge SOCa1, respectively.

Next, the procedure is advanced to step 501 and a charging level correction process is carried out. This process is carried out as follows. That is, an actual measurement value of the variation $\Delta SOC(B)$ from the lower-limit state of charge SOCa1 obtained at step 500 is compared with an experimental value of the variation $\Delta SOC(A)$ during the drop from the voltage V1 to the voltage V3 experimentally pre-determined; the difference (a correction amount a) between the experimental value of the variation $\Delta SOC(A)$ and the actual measurement value of the variation $\Delta SOC(B)$ is calculated; and the correction amount $\alpha$ is added to the lower-limit state of charge SOCa1 ($\alpha_{D61}$ and $\alpha_{D62}$ are added to the curves D61 and D62 shown in FIG. 6).

FIG. 7 shows a curve indicating the correction amount $\alpha$ using the voltage $V_{SOCa1}$ at the time of passing the lower-limit state of charge SOCa1 as a parameter. In FIG. 7, when $V_{SOCa1}=V1$, the state of charge SOC at the voltage V3 is set to be 15% and accordingly the correction amount $\alpha$ is set to be zero when the actual measurement value of the variation $\Delta SOC(B)$ is 30−15=15%. When $V_{SOCa1}=V1$, as described above, the occurrence of the memory effect is determined based on the voltage drop in the secondary battery. However, when $V_{SOCa1}>V1$ and $V_{SOCa1}<V1$, the occurrence of the memory effect is determined based on the distance the vehicle was driven, the number of times for which the state of charge has reached the lower- or upper-limit in the range of capacity actually used of the secondary battery, and the like in addition to the voltage drop in the secondary battery.

Third Embodiment

Next, a third embodiment of the present invention is described with reference to FIGS. 8, 9 and 10.

Figure 8:
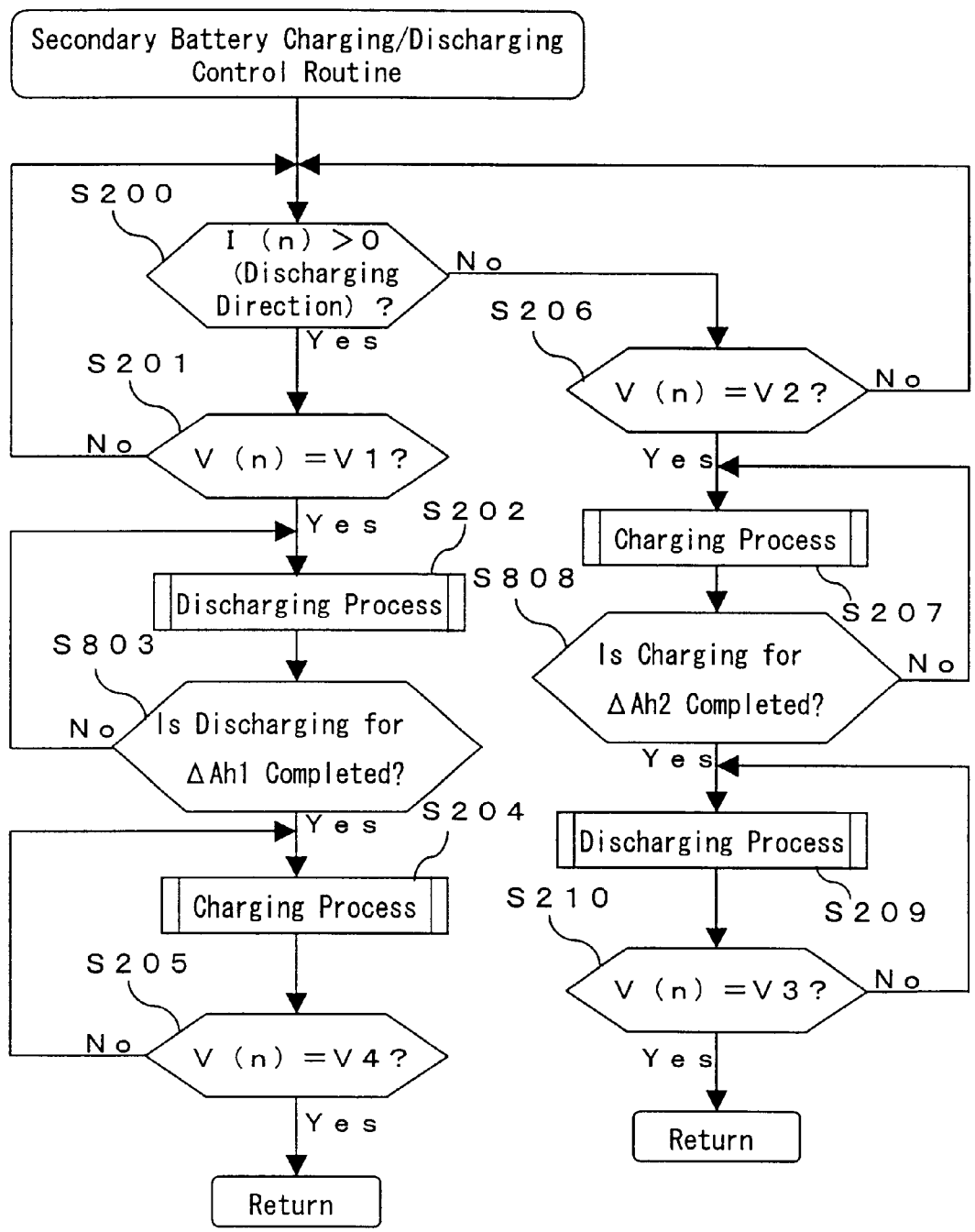
FIG. 8 is a flowchart showing a secondary-battery charging/discharging control routine according to a third embodiment of the present invention.

FIG. 8 is a flowchart showing a secondary battery charging/discharging control routine according to the third embodiment of the present invention. In the first embodiment, in order to cancel the memory effects caused during discharging and charging, the discharging was allowed to continue for a period in which the battery voltage drops from the voltage V1 to the voltage V3 and the charging was allowed to continue for a period in which the battery voltage rises from the voltage V2 to the voltage V4. The present embodiment, however, is different from the first embodiment in that discharging is carried out for a predetermined discharging amount $\Delta Ah1$ after the battery voltage reaches the voltage V1 and charging is carried out for a predetermined charging amount $\Delta Ah2$ after the battery voltage reaches the voltage V2. In the following, only the different steps from those in the first embodiment are described. The same steps as in the first embodiment are indicated with the same numerals and characters and their descriptions are not repeated.

Figure 9:
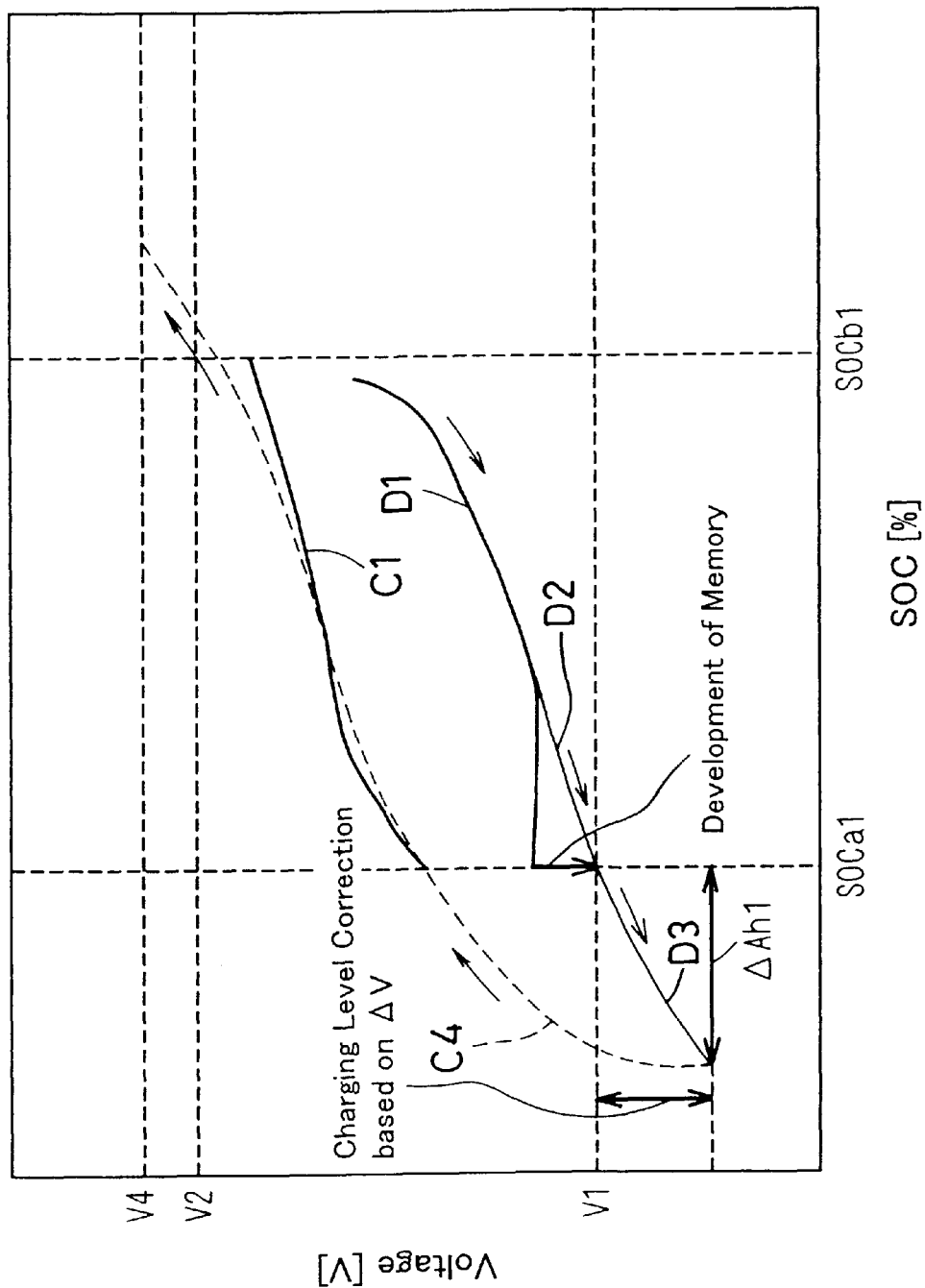
FIG. 9 is a graph showing a curve indicating a battery voltage with respect to a state of charge SOC, for explaining a method of canceling a memory effect caused during discharging according to the third embodiment.
Figure 10:
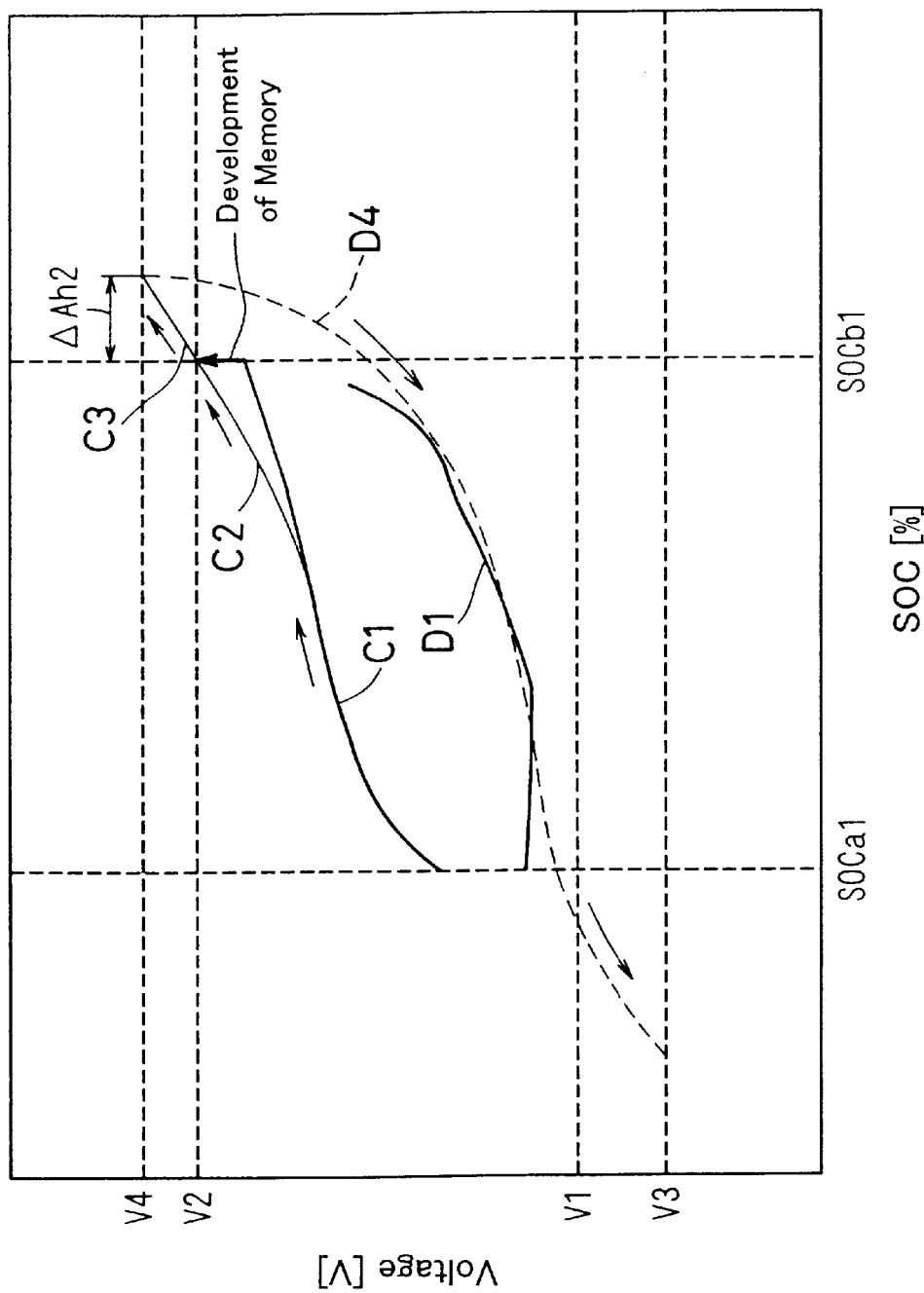
FIG. 10 is a graph showing a curve indicating a battery voltage with respect to a state of charge SOC, for explaining a method of canceling a memory effect caused during charging according to the third embodiment.

FIGS. 9 and 10 are graphs obtained by plotting the battery voltages with respect to the state of charge SOC, for explaining the method of canceling the memory effects caused during discharging and charging according to the third embodiment.

In FIG. 8, when the determination that the voltage sample V(n) at least per cell had reached the voltage V1 was made at step 201 (the curve D1 shifts to the curve D2 shown in FIG. 9), it is determined that the memory effect has occurred during discharging and a discharging process is carried out further to discharge the secondary battery (S202). Next, it is determined whether the discharging has been carried out for the predetermined discharging amount ΔAh1 as the result of the discharging process at step 202 (S803). When it is determined at step 803 that the discharging has not been carried out for the predetermined discharging amount ΔAh1, the discharging process at step 202 continues (i.e. following the discharging curve D3 shown in FIG. 9).

When it was determined at step 803 that the discharging had been carried out for the predetermined discharging amount ΔAh1, the canceling of the memory effect caused during discharging is completed.

Next, the description is directed to the cancellation of the memory effect caused during charging.

When the determination that the voltage sample V(n) at least per cell had reached the voltage V2 was made at step 206 (the curve C1 shifts to the curve C2 shown in FIG. 10), it is determined that the memory effect has occurred during the charging, and the charging process is carried out further to charge the secondary battery (S207). Next, it is determined whether the charging has been carried out for the predetermined charging amount ΔAh2 as the result of the charging process at step 207 (S808). When it is determined at step 808 that the charging has not been carried out for the predetermined charging amount ΔAh2, the charging process at step 207 continues (i.e. following the charging curve C3 shown in FIG. 10).

When it is determined at step 808 that the charging has been carried out for the predetermined charging amount ΔAh2, the canceling of the memory effect caused during the charging is completed.

Fourth Embodiment

Next, a fourth embodiment of the present invention is described with reference to FIGS. 11 and 12.

Figure 11:
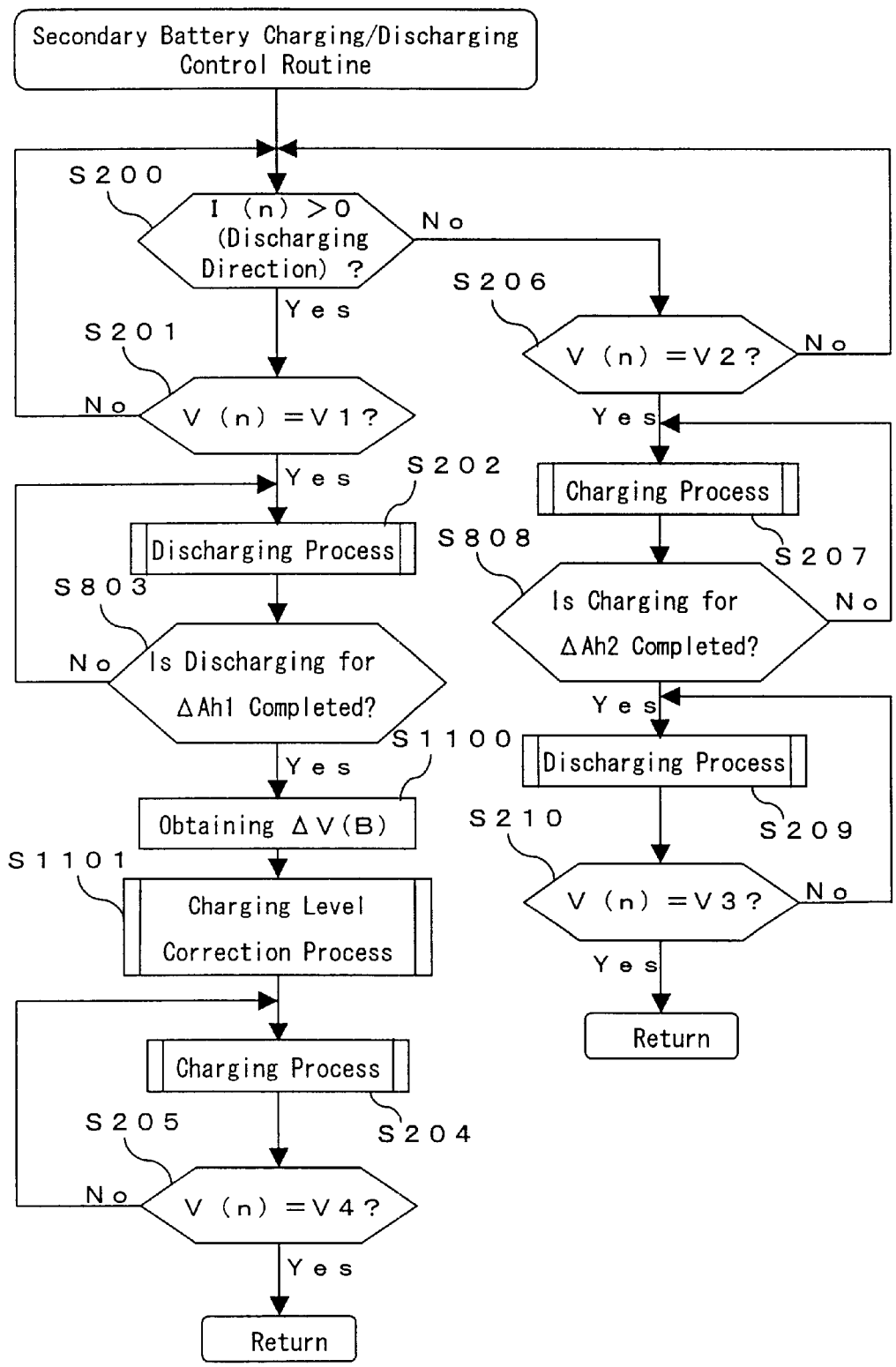
FIG. 11 is a flowchart showing a secondary-battery charging/discharging control routine according to a fourth embodiment of the present invention.

FIG. 11 is a flowchart showing a secondary battery charging/discharging control routine according to the fourth embodiment of the present invention. The present embodiment is different from the third embodiment in that in addition to the cancellation of the memory effects during discharging and charging, the charging level of the secondary battery is corrected and thus the range of capacity actually used is controlled accurately in the case where an actual voltage drop ΔV(B) deviates from a voltage drop ΔV(A) experimentally obtained when the discharging is carried out for ΔAh1 at the battery voltage V1, due to the distance the vehicle was driven or the like. In the following, only the different steps from those in the third embodiment are described. The same steps as in the third embodiment are indicated with the same numerals and characters and their descriptions are not repeated.

Figure 12:
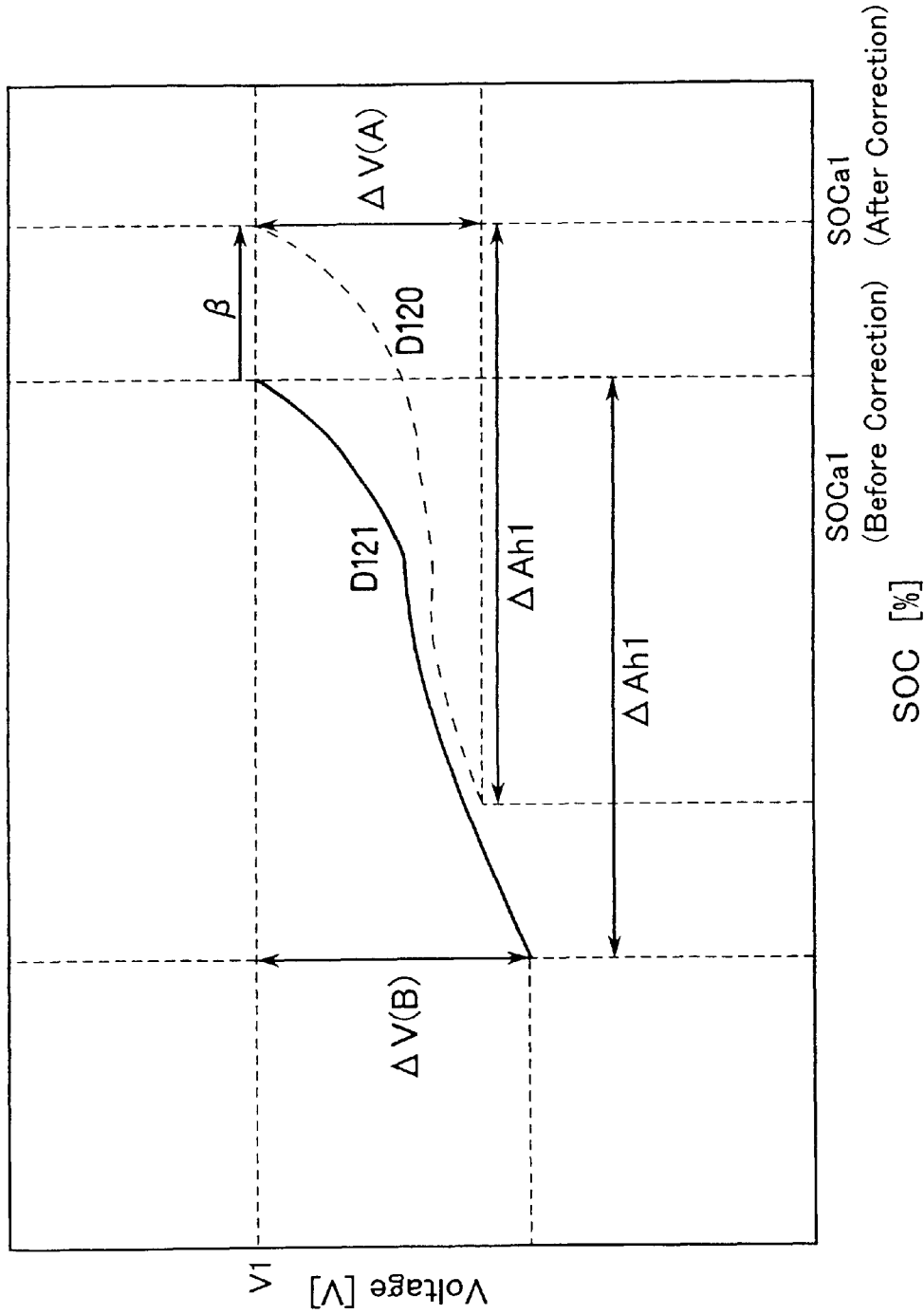
FIG. 12 is a graph showing a curve indicating a battery voltage with respect to a state of charge SOC, for explaining a charging level correction during discharging of a secondary battery according to the fourth embodiment.

FIG. 12 is a graph showing a curve indicating a battery voltage with respect to the state of charge (SOC), for explaining charging level correction during discharging of a secondary battery according to the fourth embodiment.

In FIG. 11, after the completion of the discharging for the predetermined discharging amount ΔAh1 (S803) and the cancellation of the memory effect caused during the discharging, a voltage drop ΔV(B) is obtained according to the discharging amount ΔAh1 (S1100).

FIG. 12 shows a curve D120 (a voltage-drop experimental value ΔA(A)) experimentally obtained and a curve D121 in the case where the voltage-drop actual measurement value ΔA(B) deviates from the voltage-drop experimental value ΔA(A).

Next, the procedure is advanced to step 1101 and a charging level correction process is carried out as follows. The voltage-drop actual measurement value ΔA(B) obtained at step 1100 is compared with the voltage-drop experimental value ΔA(A) experimentally pre-determined; the difference (a correction amount β) between the voltage-drop experimental value ΔA(A) and the voltage-drop actual measurement value ΔA(B) is calculated; and the correction amount β is added to the lower-limit state of charge SOCa1.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A charging/discharging control device, comprising:
   a secondary battery formed of a battery assembly with a plurality of cells combined with one another;
   a memory effect determinator for determining whether a discharging memory effect has occurred, based on at least one of the following determinations:
   whether a time of charging/discharging of the secondary battery has reached a predetermined time;
   whether a charging/discharging amount in the secondary battery has reached a predetermined amount; and
   whether a voltage per cell of the plurality of cells has reached a voltage V1 at a lower-limit state of charge in a range of capacity actually used; and
   a discharging controller for discharging the secondary battery until the voltage per cell reaches a voltage V3 that is higher than 1.0 V and is lower than the voltage V1 at the lower-limit state of charge when the memory effect determinator determines that the discharging memory effect has occurred.

2. The charging/discharging control device according to claim 1, further comprising a charging controller for charging the secondary battery until the voltage per cell reaches a voltage V4 that is higher than a voltage V2 at an upper-limit state of charge in the range of capacity actually used after completion of the discharging of the secondary battery by the discharging controller based on the determination by the memory effect determinator that the discharging memory effect has occurred.

3. The charging/discharging control device according to claim 2, wherein discharging and charging of the secondary battery are repeated in this order at least once, wherein the discharging is carried out by the discharging controller until the voltage per cell reaches the voltage V3 from the voltage V4, and the charging is carried out by the charging controller until the voltage per cell reaches the voltage V4 from the voltage V3.

4. The charging/discharging control device according to claim 1, further comprising a charging level corrector for correcting a charging level at the lower-limit state of charge based on a discharging amount when the discharging is carried out until the voltage per cell reaches the voltage V3 from the voltage V1 by the discharging controller.

5. A charging/discharging control device, comprising:
   a secondary battery formed of a battery assembly with a plurality of cells combined with one another;
   a memory effect determinator for determining whether a discharging memory effect has occurred, based on at least one of the following determinations:

whether a time of charging/discharging of the secondary battery has reached a predetermined time;
whether a charging/discharging amount in the secondary battery has reached a predetermined amount; and
whether a voltage per cell of the plurality of cells has reached a voltage V1 at a lower-limit state of charge in a range of capacity actually used; and
a discharging controller for discharging the secondary battery for a predetermined amount from the lower-limit state of charge when the memory effect determinator determines that the discharging memory effect has occurred.

6. The charging/discharging control device according to claim 5, further comprising a charging controller for charging the secondary battery until the voltage per cell reaches a voltage V4 that is higher than a voltage V2 at an upper-limit state of charge in the range of capacity actually used after completion of the discharging of the secondary battery by the discharging controller based on the determination by the memory effect determinator that the discharging memory effect has occurred.

7. The charging/discharging control device according to claim 6, wherein discharging and charging of the secondary battery are repeated in this order at least once, wherein the discharging is carried out by the discharging controller until the voltage per cell reaches a voltage V3 that is lower than the voltage V1 at the lower-limit state of charge from the voltage V4, and the charging is carried out by the charging controller until the voltage per cell reaches the voltage V4 from the voltage V3.

8. The charging/discharging control device according to claim 5, further comprising a charging level corrector for correcting a charging level at the lower-limit state of charge based on the voltage per cell after the secondary battery is discharged for the predetermined amount from the lower-limit state of charge by the discharging controller.

9. A charging/discharging control device, comprising:
a secondary battery formed of a battery assembly with a plurality of cells combined with one another;
a memory effect determinator for determining whether a charging memory effect has occurred, based on at least one of the following determinations:
whether a time of charging/discharging of the secondary battery has reached a predetermined time;
whether a charging/discharging amount in the secondary battery has reached a predetermined amount; and
whether a voltage per cell of the plurality of cells has reached a voltage V2 at an upper-limit state of charge in a range of capacity actually used; and
a charging controller for charging the secondary battery until the voltage per cell reaches a voltage V4 that is higher than the voltage V2 at the upper-limit state of charge when the memory effect determinator determines that the charging memory effect has occurred.

10. The charging/discharging control device according to claim 9, further comprising a discharging controller for discharging the secondary battery until the voltage per cell reaches a voltage V3 that is lower than a voltage V1 at a lower-limit state of charge in the range of capacity actually used after completion of the charging of the secondary battery by the charging controller based on the determination by the memory effect determinator that the charging memory effect has occurred.

11. The charging/discharging control device according to claim 10, wherein charging and discharging of the secondary battery are repeated in this order at least once, wherein the charging is carried out by the charging controller until the voltage per cell reaches the voltage V4 from the voltage V3, and the discharging is carried out by the discharging controller until the voltage per cell reaches the voltage V3 from the voltage V4.

12. A charging/discharging control device, comprising:
a secondary battery formed of a battery assembly with a plurality of cells combined with one another;
a memory effect determinator for determining whether a charging memory effect has occurred, based on at least one of the following determinations:
whether a time of charging/discharging of the secondary battery has reached a predetermined time;
whether a charging/discharging amount in the secondary battery has reached a predetermined amount; and
whether a voltage per cell of the plurality of cells has reached a voltage V2 at an upper-limit state of charge in a range of capacity actually used; and
a charging controller for charging the secondary battery for a predetermined amount from the upper-limit state of charge when the memory effect determinator determines that the charging memory effect has occurred.

13. The charging/discharging control device according to claim 12, further comprising a discharging controller for discharging the secondary battery until the voltage per cell reaches a voltage V3 that is lower than a voltage V1 at a lower-limit state of charge in the range of capacity actually used after completion of the charging of the secondary battery by the charging controller based on the determination by the memory effect determinator that the charging memory effect has occurred.

14. The charging/discharging control device according to claim 13, wherein charging and discharging of the secondary battery are repeated in this order at least once, wherein the charging is carried out by the charging controller until the voltage per cell reaches a voltage V4 that is higher than the voltage V2 at the upper-limit state of charge from the voltage V3, and the discharging is carried out by the discharging controller until the voltage per cell reaches the voltage V3 from the voltage V4.

15. A charging/discharging control method, comprising:
determining whether a discharging memory effect has occurred, based on at least one of the following determinations:
whether a time of charging/discharging of a secondary battery formed of a battery assembly with a plurality of cells combined with one another has reached a predetermined time;
whether a charging/discharging amount in the secondary battery has reached a predetermined amount; and
whether a voltage per cell of the plurality of cells has reached a voltage V1 at a lower-limit state of charge in a range of capacity actually used; and
discharging the secondary battery until the voltage per cell reaches a voltage V3 that is higher than 1.0 V and is lower than the voltage V1 at the lower-limit state of charge when it is determined that the discharging memory effect has occurred.

16. The charging/discharging control method according to claim 15, further comprising charging the secondary battery until the voltage per cell reaches a voltage V4 that is higher than a voltage V2 at an upper-limit state of charge in the range of capacity actually used after completion of the discharging of the secondary battery based on the determination that the discharging memory effect has occurred.

17. The charging/discharging control method according to claim 16, wherein discharging and charging of the secondary battery are repeated in this order at least once, wherein the discharging is carried out until the voltage per cell reaches the voltage V3 from the voltage V4, and the charging is carried out until the voltage per cell reaches the voltage V4 from the voltage V3.

18. The charging/discharging control method according to claim 15, further comprising correcting a charging level at the lower-limit state of charge based on a discharging amount when the discharging is carried out until the voltage per cell reaches the voltage V3 from the voltage V1.

19. A charging/discharging control method, comprising:
  determining whether a discharging memory effect has occurred, based on at least one of the following determinations:
    whether a time of charging/discharging of a secondary battery formed of a battery assembly with a plurality of cells combined with one another has reached a predetermined time;
    whether a charging/discharging amount in the secondary battery has reached a predetermined amount; and
    whether a voltage per cell of the plurality of cells has reached a voltage V1 at a lower-limit state of charge in a range of capacity actually used; and
  discharging the secondary battery for a predetermined amount from the lower-limit state of charge when it is determined that the discharging memory effect has occurred.

20. The charging/discharging control method according to claim 19, further comprising charging the secondary battery until the voltage per cell reaches a voltage V4 that is higher than a voltage V2 at an upper-limit state of charge in the range of capacity actually used after completion of the discharging of the secondary battery based on the determination that the discharging memory effect has occurred.

21. The charging/discharging control method according to claim 20, wherein discharging and charging of the secondary battery are repeated in this order at least once, wherein the discharging is carried out until the voltage per cell reaches a voltage V3 that is lower than the voltage V1 at the lower-limit state of charge from the voltage V4, and the charging is carried out until the voltage per cell reaches the voltage V4 from the voltage V3.

22. The charging/discharging control device according to claim 19, further comprising correcting a charging level at the lower-limit state of charge based on the voltage per cell after the secondary battery is discharged for the predetermined amount from the lower-limit state of charge.

23. A charging/discharging control method, comprising:
  determining whether a charging memory effect has occurred, based on at least one of the following determinations:
    whether a time of charging/discharging of a secondary battery formed of a battery assembly with a plurality of cells combined with one another has reached a predetermined time;
    whether a charging/discharging amount in the secondary battery has reached a predetermined amount; and
    whether a voltage per cell of the plurality of cells has reached a voltage V2 at an upper-limit state of charge in a range of capacity actually used; and
  charging the secondary battery until the voltage per cell reaches a voltage V4 that is higher than the voltage V2 at the upper-limit state of charge when it is determined that the charging memory effect has occurred.

24. The charging/discharging control method according to claim 23, further comprising discharging the secondary battery until the voltage per cell reaches a voltage V3 that is lower than a voltage V1 at a lower-limit state of charge in the range of capacity actually used after completion of the charging of the secondary battery based on the determination that the charging memory effect has occurred.

25. The charging/discharging control method according to claim 24, wherein charging and discharging of the secondary battery are repeated in this order at least once, wherein the charging is carried out until the voltage per cell reaches the voltage V4 from the voltage V3, and the discharging is carried out until the voltage per cell reaches the voltage V3 from the voltage V4.

26. A charging/discharging control method, comprising:
  determining whether a charging memory effect has occurred, based on at least one of the following determinations:
    whether a time of charging/discharging of a secondary battery formed of a battery assembly with a plurality of cells combined with one another has reached a predetermined time;
    whether a charging/discharging amount in the secondary battery has reached a predetermined amount; and
    whether a voltage per cell of the plurality of cells has reached a voltage V2 at an upper-limit state of charge in a range of capacity actually used; and
  charging the secondary battery for a predetermined amount from the upper-limit state of charge when it is determined that the charging memory effect has occurred.

27. The charging/discharging control method according to claim 26, further comprising discharging the secondary battery until the voltage per cell reaches a voltage V3 that is lower than a voltage V1 at a lower-limit state of charge in the range of capacity actually used after completion of the charging of the secondary battery based on the determination that the charging memory effect has occurred.

28. The charging/discharging control method according to claim 27, wherein charging and discharging of the secondary battery are repeated in this order at least once, wherein the charging is carried out until the voltage per cell reaches a voltage V4 that is higher than the voltage V2 at the upper-limit state of charge from the voltage V3, and the discharging is carried out until the voltage per cell reaches the voltage V3 from the voltage V4.

* * * * *